United States Patent
Califorrniaa

(10) Patent No.: US 6,694,175 B1
(45) Date of Patent: Feb. 17, 2004

(54) METHOD OF MONITORING THE BODY TEMPERATURE OF HUMAN EMBRYOS AND HATCHLINGS

(76) Inventor: Eurica Califorrniaa, P.O. Box 2328, Malibu, CA (US) 90265-7328

(*) Notice: Subject to any disclaimer, the term of this patent is extended or adjusted under 35 U.S.C. 154(b) by 175 days.

(21) Appl. No.: 10/079,955

(22) Filed: Feb. 19, 2002

(51) Int. Cl.$^7$ ............... A61B 5/00; A61B 5/01
(52) U.S. Cl. ............... 600/474; 600/22; 236/2; 237/3
(58) Field of Search ............... 600/473, 474, 600/475, 407, 22, 427, 549, 310; 250/330, 316.1, 338.1, 472.1; 435/289.1, 303.1, 305.2; 209/510, 511; 73/861.95; 236/2–5; 237/3; 607/88, 90–96, 102; 374/100, 120, 121, 132, 133, 141, 145, 163

(56) References Cited

U.S. PATENT DOCUMENTS

| | | | | |
|---|---|---|---|---|
| 3,634,651 A | * | 1/1972 | Siegel et al. | 219/400 |
| 4,161,172 A | * | 7/1979 | Pickering | 600/22 |
| 4,384,193 A | * | 5/1983 | Kledzik et al. | 219/521 |
| 4,788,427 A | * | 11/1988 | LeRoy | 250/330 |
| 4,914,672 A | * | 4/1990 | Hebrank | 374/124 |
| 5,727,915 A | * | 3/1998 | Suzuki | 414/1 |
| 5,817,003 A | * | 10/1998 | Moll et al. | 600/22 |
| 5,993,886 A | * | 11/1999 | Polster | 426/614 |
| 5,999,843 A | * | 12/1999 | Anbar | 600/474 |
| 6,193,647 B1 | * | 2/2001 | Beebe et al. | 600/33 |
| 6,234,320 B1 | * | 5/2001 | Hebrank | 209/510 |
| 6,448,069 B1 | * | 9/2002 | Cecchi et al. | 435/305.2 |
| 6,468,784 B1 | * | 10/2002 | Takeshita et al. | 435/287.1 |
| 2002/0068358 A1 | * | 6/2002 | Campbell et al. | 435/289.1 |
| 2002/0188168 A1 | * | 12/2002 | Koch | 600/22 |

OTHER PUBLICATIONS

OK J., Chu M., and Kim C.-J. "Pneumatically Driven Micro–Objects in Biological Liquid," Proc. IEEE Conf. Micro Electro Mechanical Systems (MEMS'99), Orlando, FL, Jan. 1999, pp. 459–463.*

Cone T.E. Jr. History of the care and feeding of the premature infant. Boston: Little, Brown, 1985. pp. 21–22.*

Dorland's Illustrated Medical Dictionary. 28$^{th}$ Ed. Philadelphia: W.B. Saunders Co., 1994. pp. 542–543, 1346.*

Dorland's Illustrated Medical Dictionary. 29$^{th}$ Ed. Philadelphia: W.B. Saunders Co., 2000. pp. 582, 1450.*

Rabin Y. & Podbilewicz B. "Temperature–controlled microscopy for imaging living cells: apparatus, thermal analysis and temperature dependency of embryonic eleongation in Caenorhabditis elegans." Journal of Microscopy, vol. 199, Sep. (2000), pp. 214–223.*

* cited by examiner

Primary Examiner—Eleni Mantis Mercader

(57) ABSTRACT

Infrared microthermography for human embryos and hatchlings. Body temperature is monitored using an infrared camera attached to a microscope. Body temperature is maintained by passing body temperature data through a feedback loop that serves to control body temperature. Keeping the baby's fluid incubation medium lower than an optimum body temperature ensures that cooling can occur if the body becomes overheated. An added source of heat is provided by one or more infrared light emitting diodes focused on the body as tiny heat lamps. The heat lamps are cycled on and off or varied in intensity in accordance with indications (data) from body temperature measurements.

1 Claim, No Drawings

US 6,694,175 B1

METHOD OF MONITORING THE BODY TEMPERATURE OF HUMAN EMBRYOS AND HATCHLINGS

BACKGROUND OF THE INVENTION

1. Field of the Invention

In general terms, my invention relates to in vitro medical care for the pre-implantation patient. More specifically, my invention relates to a new use for quantum well infrared photodetector (QWIP) technology: monitoring and maintaining the body temperature of human embryos and hatchlings in an engineered environment. The engineered environment is preferably a micro intensive care unit ($\mu$ICU).

A human is an embryo only from conception to hatching. Hatching is an event that takes place when an embryo escapes the shell of the egg that he or she was conceived in. A human is a hatchling only from hatching until implantation (nidation).

2. Prior Art

The quantum well infrared photodetector (QWIP) camera was invented by Sarath Gunapala at NASA's Jet Propulsion Laboratory. (U.S. Pat. No. 6,211,529. Gunapala et al. Infrared radiation-detecting device.) QWIP technology has yielded one of the most sensitive yet affordable handheld long-wavelength infrared cameras. A QWIP camera may have a thermal sensitivity as sharp as 20 mK (twenty thousandths of one Kelvin degree). OmniCorder Technologies (Stony Brook, N.Y.) manufactures its BioScanIR System for imaging and recording thermal data from adult, pediatric, and neonatal patients using a QWIP camera.

Infrared cameras are generally better at picking out actual differences in temperature than they are at picking out actual temperatures. A measure of imaging performance, thermal sensitivity validates a numerical difference between two or more temperature measurements on a thermal imaging map. This form of relative measurement is meant to reflect a real temperature difference between points on the map. In contrast, thermal accuracy validates a numerical identity between a temperature measurement and the corresponding real temperature. This form of absolute measurement is meant to establish a number reflecting the real temperature of a point on the map. A point on the map can serve as a reference temperature when it is known with greater thermal accuracy than the thermal accuracy specified for the camera. Depending on the accuracy of the reference, the camera may yield an effective thermal accuracy nearly equal to its thermal sensitivity.

Heat lamps emit infrared radiation to provide a heating source. Heat lamps are often used to warm neonates, especially if they are born premature. An infrared light emitting diode (LED) emits infrared radiation on a very small scale. The shell of a human embryo's egg covers an inner diameter of approximately 100 microns (0.1 millimeters) at fertilization and has a spherical shape. Because human embryos and hatchlings are so small, an infrared LED can generate enough heat to warm the baby.

Miriam Menkin discovered the first reported human in vitro fertilization in 1944, with support from Harvard physician John Rock. (Marsh M. and Ronner W. *The Empty Cradle: Infertility in America from Colonial Times to the Present.* Baltimore, Johns Hopkins University Press, 1996. p. 171–209.) Death of the child introduced the problem of "miscarriage in vitro". Today there is a growing effort to reduce miscarriage in vitro by engineering better environments. Yet this effort has been impeded by some experts who prefer unimaginative reliance on crude petri dish methods.

We are arriving at the point where as humans we will be able to care for our children from conception with the utmost intelligence and resource. Ironically, the last steps are not technology. They are simply courage.

Although micromanipulation techniques and petri dish practices have been employed since the inception of human in vitro fertilization, the advent of a new branch of engineering called micro electro mechanical systems (MEMS) has sparked interest in improving the technology of in vitro fertilization. To this end, David Beebe et al. have invented a MEMS-based means of providing embryos and hatchlings with fluidic ventilation. (U.S. Pat. No. 6,193,647. Beebe et al. Microfluidic embryo and/or oocyte handling device and method.)

By promoting child health and strength up until the time of being introduced to the maternal body, engineered environments will make pregnancy more survivable for children created and first cared for outside the maternal body. This benefit comes in addition to the benefit of reducing in vitro miscarriage itself.

My institution, Juridic Embassy, has sponsored new progress in fertility care, in an effort to advance diplomatic regard for the rights of children as patients in medicine. As a consequence of my research in this area, I initiated the Micro ICU Project in response to the general lack of care being provided to children created by in vitro fertilization. The synergy of the project was created by the needs of the children in light of impressive new engineering technologies, particularly MEMS. Using integrated microfabrication technologies (IMT) such as complementary metal oxide semiconductor technology (CMOS) and MEMS, as well as various large-scale technologies, the goal of the project is to perfect an elaborately engineered environment called a micro intensive care unit, or $\mu$ICU, for human embryos and hatchlings.

One objective of the Micro ICU Project is to provide a means to monitor and maintain body temperature. This objective provides the subject matter of my present invention.

3. Statement of the Necessity

In modern fertility programs, human embryos and hatchlings are incubated outside the maternal body in a fluid incubation medium. Prior art methods of temperature monitoring and maintenance rely exclusively on a measurement of the temperature of the fluid incubation medium. The temperature of the medium is set to 37 degrees Celsius using a temperature-controlled incubator oven or microscope stage warmer.

However, because of endogenous heat production, which is the heat produced by a baby's own body, the baby's body temperature can differ from the ambient temperature of the surrounding environment or medium. Accordingly, the baby can become overheated, leading to exhaustion, dysfunction, and death, when only the temperature of the environment is controlled. (Cone T. E. Jr. *History of the Care and Feeding of the Premature Infant.* Boston: Little, Brown, 1985. p. 21–22.) Thus, a problem with the prior art in the field of in vitro fertilization is its focus on the temperature of the fluid incubation medium, instead of on body temperature itself.

What is needed to modernize the art of in vitro fertilization is a method to monitor and maintain the baby's actual body temperature.

BRIEF DESCRIPTION OF THE INVENTION

To monitor the body temperature of a human embryo or hatching: attach a quantum well infrared photodetector (QWIP) camera to a microscope and use appropriate computer technology to thermally image the embryo or hatchling.

To maintain the body temperature of a human embryo or hatchling: keep the fluid incubation medium slightly below optimum body temperature to ensure cooling can occur if the body becomes overheated; provide an added source of heat by focusing tiny heat lamps on the body of the embryo or hatchling; cycle the heat lamps on and off or apply them with varying intensity to maintain optimum body temperature in accordance with body temperature measurements obtained by the above-stated monitoring method.

DETAILED DESCRIPTION OF THE INVENTION

The main thrust of my invention is to employ an infrared camera to monitor the body temperature of a human embryo or hatchling under a microscope. The embryo or hatching is kept in a fluid incubation medium in an engineered environment.

My invention prefers a quantum well infrared photodetector (QWIP) camera with a high thermal sensitivity (20 mK), such as the ThermaCAM® SC 3000 from FLIR Systems (North Billerica, Mass.), although other infrared technology can be substituted. To effectively enhance the thermal accuracy of the camera, a reference temperature can be obtained (for example, by thermocouple) with respect to the fluid incubation medium or other point in the camera's field of view. Although the camera can be fitted with its own microscope lens, my invention prefers attachment of the camera to the camera port of an inverted microscope—the microscope having a camera port and being suitable for visualizing the body of a human embryo or hatching; for example, the IX70 Inverted Research Microscope from Olympus America (Melville, N.Y.). By employing means of computer technology to process, store, and display output from the camera, my invention enables medical practitioners to thermally image the body temperature of each embryo or hatchling who is visualized under the microscope.

To maintain optimum body temperature for a human embryo or hatchling, a means of cooling the body must be provided for when the baby's temperature is too high, and a means of warming the body must be provided for when the baby's temperature is too low. A preferred determination of low or high temperature is made by comparing data from the QWIP camera with an established value for optimum body temperature. Although an assortment of means for cooling and heating can be described or anticipated, my invention prefers heat lamps as the means of heating and further prefers a cool fluid incubation medium as the means of cooling. To provide a means of cooling, the fluid incubation medium is kept slightly cooler than the optimum body temperature. To provide a means of heating, one or more infrared light emitting diodes are employed as tiny heat lamps focused on the body to provide an added source of heat when needed to offset the ambient coolness of the fluid incubation medium. The heat lamps are cycled on and off or varied in intensity to maintain the optimum body temperature, in accordance with body temperature measurements obtained preferably by the above-stated monitoring method.

I claim:

1. A method of monitoring an actual body temperature of a human embryo or hatchling and maintaining an optimum body temperature of the human embryo or hatchling comprising:

(a). attaching a quantum well infrared photodetector camera to a microscope, the microscope having a camera port and being suitable for visualizing the body of a human embryo or hatchling;

(b). employing means of computer technology to process, store, and display output from the quantum well infrared photodetector camera, so as to thermally image and measure an actual body temperature of the human embryo or hatchling who is visualized under the microscope and which said actual body temperature can differ from an ambient temperature of a fluid incubation medium;

(c). maintaining the human embryo or hatchling in the fluid incubation medium, wherein the ambient temperature of said fluid incubation medium is being kept slightly cooler than required for an optimum body temperature of the human embryo or hatching so as to ensure cooling if the body of the human embryo or hatchling becomes overheated;

(d). providing an added source of heat by focusing one or more tiny heat lamps on the body of the human embryo or hatchling;

(e). cycling the tiny heat lamps on and off or varying them in intensity to maintain the optimum body temperature, by comparing the actual body temperature of the human embryo or hatching obtained in step (a) and step (b) with the optimum body temperature.

* * * * *